United States Patent
Akapatangkul

[11] Patent Number: 5,269,229
[45] Date of Patent: Dec. 14, 1993

[54] RETRACTIBLE TRAY ASSEMBLY FOR USE ON A VEHICLE SEAT BACK

[76] Inventor: Niran Akapatangkul, 24311 Carlene La., Lomita, Calif. 90717

[21] Appl. No.: 831,985

[22] Filed: Feb. 6, 1992

[51] Int. Cl.⁵ .............................. A47B 23/00
[52] U.S. Cl. ........................... 108/44; 108/47
[58] Field of Search ............ 108/44, 46, 47, 48, 108/40, 38; 297/163, 146, 147

[56] References Cited

U.S. PATENT DOCUMENTS

| | | | |
|---|---|---|---|
| 1,299,827 | 4/1919 | Edwards | 108/44 X |
| 1,843,391 | 2/1932 | Gayle | 108/47 X |
| 2,687,336 | 8/1954 | Smith et al. | 108/44 X |
| 2,878,945 | 3/1959 | Speir | 108/44 X |
| 3,233,563 | 2/1966 | Mauchline | 100/44 |
| 5,046,433 | 9/1991 | Kramer et al. | 108/44 |

FOREIGN PATENT DOCUMENTS 792634 12/1966 Canada ........................ 108/40

Primary Examiner—Jose V. Chen
Attorney, Agent, or Firm—Boniard I. Brown

[57] ABSTRACT

A retractible tray assembly is mounted at the rear surface of a vehicle seat and can be swung between a retracted upright position within a support frame and a generally horizontal service position extending outwardly from the frame. Tracks along side edges of the tray enable the tray to be slidably adjusted toward or away from a person seated behind the tray.

6 Claims, 2 Drawing Sheets

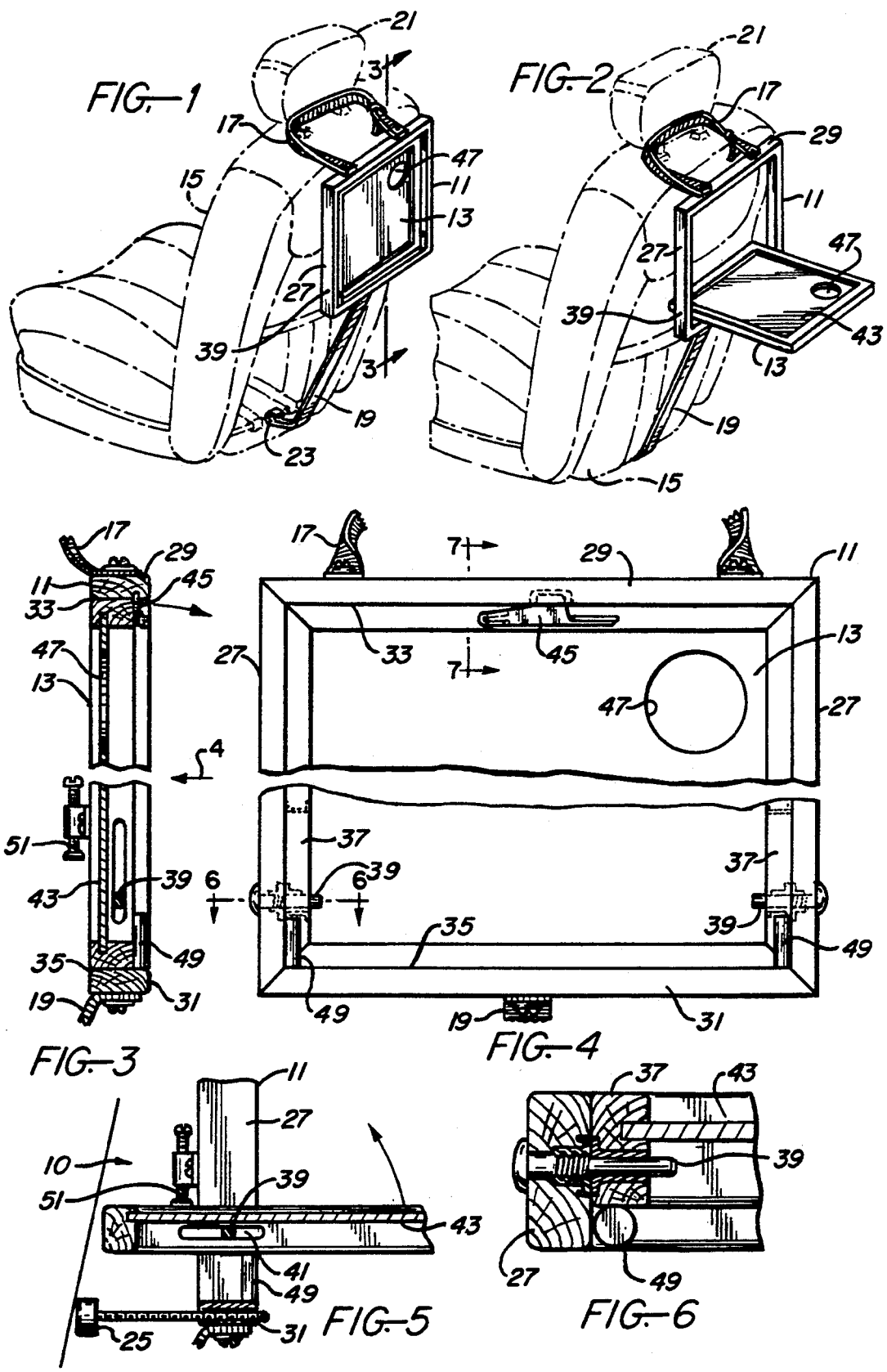

RETRACTIBLE TRAY ASSEMBLY FOR USE ON A VEHICLE SEAT BACK

BACKGROUND OF THE INVENTION

1. Field of the Invention

The present invention relates to a tray assembly for use on a vehicle seat back, e.g., on the rear surface of the front seat of an automobile, whereby passengers in the rear seat may utilize the tray for placement of coffee, sandwiches, etc., thereon. The invention is usable in various vehicles, such as automobiles, buses, railroad cars, and aircraft.

2. Prior Art

U.S. Pat. No. 5,046,433 to Kramer, et al, and U.S. Pat. No. 2,878,945 to E. Speir disclose foldable tray assemblies mounted on the rear surfaces of automobile front seats. The tray assemblies can be folded or pivoted to relatively flat conditions against the seat rear surface when the trays are not in use. The purpose is to retract the tray against the seat rear surface where it will not be struck by the knees of persons seated in the rear seat. Also, the retracted tray assembly will have less tendency to be an obstruction when a person is entering the rear seat area of the vehicle.

U.S. Pat. No. 2,503,602 to W. Titley, and U.S. Pat. No. 2,680,523 to G. Heeter, and U.S. Pat. No. 4,770,107 to D. Miller show non-foldable automobile tray assemblies. Straps or hook structures suspend the tray assemblies from the front seats of the vehicle. When not in use, the tray assemblies are removed from the vehicle seats and stored in the vehicle trunk or elsewhere outside the passenger compartment of the vehicle.

The present invention is concerned with a vehicle tray assembly of the foldable or retractible type, i.e., a tray assembly of the general type shown in the Speir and Kramer, et al. patents.

A problem with foldable vehicle tray assemblies mounted on the rear surfaces of vehicle front seats is that the tray assembly should not project too far down along the seat rear surface. Leg room in the rear seat areas of most automobiles is somewhat limited and adult persons seated in the rear seat of a vehicle have their knees in near proximity to the rear surface of the front seat. Therefore, if a foldable tray assembly is to be mounted on the rear surface of the vehicle front seat, its lower edge should be above the point where the person's knees are located when in a normal seated position.

Another factor to be taken into account in the design of a foldable tray assembly is driver visibility. The upper edge of any tray assembly mounted on the rear surface of the vehicle front seat should not extend above the upper edge of the vehicle seat back. Any undue upward projection of the tray assembly above the upper edge of the seat back could interfere with the driver's rearward vision through the rear view mirror. The present invention relates to a foldable, retractible tray assembly for mounting on the rear surface of a vehicle front seat, wherein the lower edge of the tray assembly is elevated a sufficient distance from the vehicle floor that a person seated in the rear seat is unlikely to have his/her knees come into contact with the tray assembly. The tray assembly has an upper edge located at or below the upper edge of the back portion of the front seat, whereby the seat assembly does not interfere with the driver's rear vision.

While the tray assembly is designed to have a relatively small vertical dimension when the tray is in its retracted condition, yet when the tray is in its prone or generally horizontal operating position it should have sufficient area as to be reachable by a person seated in the back seat. The invention provides a retractible tray assembly which poses minimal interference to rear seat passenger comfort when in the retracted condition, and yet achieves a desired degree of accessibility when in the extended service condition.

SUMMARY OF THE INVENTION

The invention contemplates a retractible tray assembly having a support frame mountable in an upright position on the rear surface of a vehicle seat, e.g., the front seat of an automobile. A tray is swingably connected to the frame for movement between a retracted upright position within the frame, and a prone, generally horizontal service position extending outwardly from the frame. The tray has tracks extending along its side edges for cooperative engagement with pivot pins extending within the frame, whereby the tray is slidably adjustable into or out of the frame when the tray is in its service position. A person in the back seat of an automobile may pull the tray toward or away from his or her body to a position which is most comfortable or accessible.

BRIEF DESCRIPTION OF THE DRAWINGS

FIG. 1 is a perspective view of a tray assembly of the present invention mounted on the rear surface of a vehicle seat, showing the tray in its retracted position.

FIG. 2 is a view like that of FIG. 1, but showing the tray swung down to its generally horizontal service position;

FIG. 3 is a sectional view taken on line 3—3 in FIG. 1;

FIG. 4 is a rear view of the tray assembly taken in the direction of arrow 4 in FIG. 3;

FIG. 5 is a fragmentary view similar to that of FIG. 3, but showing the tray in its generally horizontal service position;

FIG. 6 is a fragmentary sectional view taken on line 6—6 in FIG. 4;

DESCRIPTION OF A PREFERRED EMBODIMENT OF THE INVENTION

Figure 7:
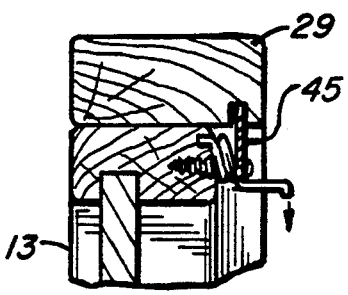
FIG. 7 is a fragmentary sectional view taken on line 7—7 in FIG. 4.

Referring to the drawings, and particularly to FIG. 1, there is shown a retractible tray assembly comprising a rectangular frame 11 and a pivotable tray 13. As shown, frame 11 is attached to the rear surface of an automobile front seat 15 by two strap assemblies 17 and 19. Strap mechanism 17 is adapted to extend about the support bar system of a headrest 21. Strap 19 is adapted to extend downwardly along the rear surface of seat 15. A hook 23 on the lower end of the strap assembly serves to attach the strap mechanism to a rear border rod or wire of the seat spring assembly.

As shown in FIG. 5, a bumper device 25 extends forwardly from frame 11 to maintain the frame in an upright position despite different inclinations of the seat rear surface in specific situations.

Frame 11 comprises two side members 27, an upper cross piece 29, and a lower cross piece 31. Tray 13 has an upper edge 33, a lower edge 35, and two side edges 37. Two aligned pivot pins 39 extend from side members 27 of the rectangular frame into linear tracks 41 carried on side edges 37 of the tray. The tray may preferably be formed of border members attached to a central panel 43. Tracks 41 are mounted in two of the border members which define the tray side edges.

The tray is normally retained in its retracted position within the profile edge dimension of frame 11 by means of a manual spring-biased latch structure 45 (FIGS. 4 and 7). A circular opening 47 in panel 43 may serve as a handle for moving the tray between its two positions (FIGS. 4 and 5). Opening 47 also serves as a retaining means for a coffee cup (not shown).

When the tray is swung down to its generally horizontal service position (FIG. 5) it comes into engagement with two stop bars 49 (FIGS. 4, 5 and 6) affixed to frame 11. As shown in FIG. 6, the representative stop bar is located within the plane of frame 11, thus not to project beyond the exposed face of the frame. Two additional stop bars 51 are carried on the concealed front face of frame 11 for engagement with an associated face of the tray when the tray reaches its horizontal position. Stop bars 51 may have screw adjustments to ensure that all four stop bars 49 and 51 have simultaneous engagement with the tray. The stop bars are oriented to engage the border members of the tray, not panel 43. The stop bars are designed to provide a rigid non-wobble support action for the tray when it is in its generally horizontal position.

A principal feature of the invention comprises the linear tracks 41. When the tray is swung down to its service position, the tracks enable the tray to be adjusted horizontally into or out of frame 11, i.e., away from a person seated in the back seat of the vehicle or toward such person. The person is enabled to adjust the tray to a position most comfortable or accessible for that person, who does not have to reach an excessive distance in order to handle items on the tray.

Tracks 41 enable the tray to be reasonably accessible without requiring that the tray assembly be excessively long in the vertical dimension. The lower edge of frame 11 may be elevated above the level of the knees of persons seated in the back seat of the vehicle, while the upper edge of frame 11 may be kept at or below the upper edge of the seat back of vehicle seat 15, thus to preserve the driver's normal rear vision.

Figure 8:
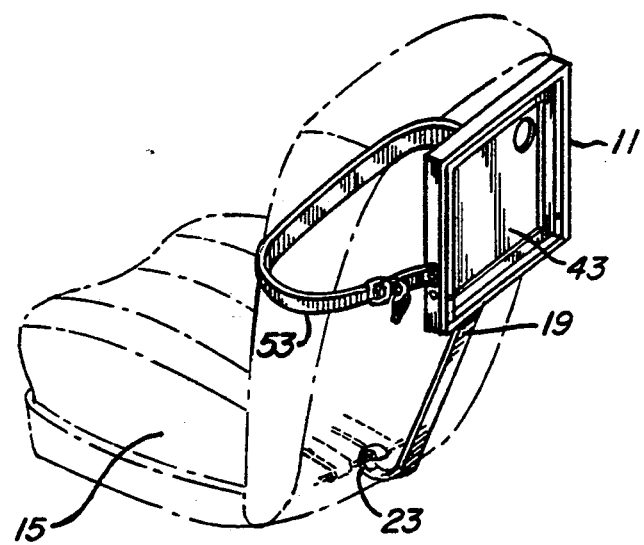
FIG. 8 is a view similar to that of FIG. 1, but showing a different type of attachment mechanism.
Figure 10:
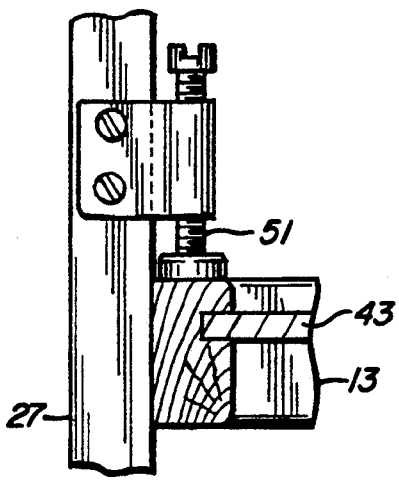
FIG. 10 is a fragmentary view taken in the direction of arrow 10 in FIG. 5.
Figure 9:
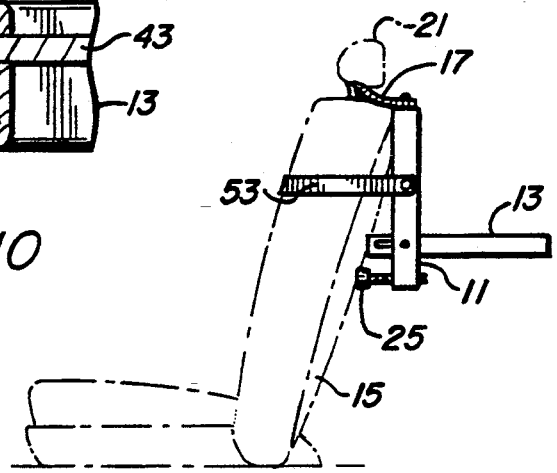
FIG. 9 is a side elevational view of the tray assembly attached to the seat with another attaching device.

FIG. 1 illustrates one particular mechanism for attaching the tray assembly to a vehicle seat. FIGS. 8 and 9 illustrate alternate attaching mechanisms which may be utilized. As shown in FIG. 8, the tray assembly is attached to the seat by an upper strap 53 encircling the upright back portion of front seat 15. An additional strap 19 extends downwardly along the seat rear surface.

As shown in FIG. 9, the tray assembly is attached to the seat structure by a headrest-encircling strap 17 and a seat back-encircling strap 53.

Figure 11:
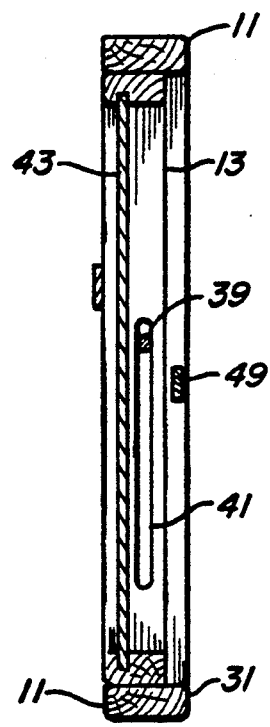
FIG. 11 is a view similar to that of FIG. 3, but illustrating another embodiment of the invention.

FIG. 11 shows an alternate form of the invention wherein pivot pins 39 are spaced an appreciable distance above the lower edge of frame 11. The tracks 41 are so oriented that pins 39 are located near the upper ends of the tracks when the tray is in its upright retracted position. With the FIG. 11 arrangement, it is possible to achieve somewhat greater slidable adjustment of the tray toward or away from a person seated in the vehicle rear seat. However, because pins 39 are in elevated positions on frame 11, the tray will be somewhat elevated when it is in its service position, which may not be desirable in all cases. The location of the pivot pin mechanism is a compromise between different operational goals and advantages. FIG. 3 represents a preferred embodiment of the invention.

Thus there has been shown and described a novel retractible tray assembly for use on a vehicle seat back which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A retractible tray assembly comprising:

an outer frame, said frame comprising two side members, an upper cross piece, and a lower cross piece, means for mounting said frame in an upright position on the rear surface of a vehicle seat, a tray pivotably connected to said frame for movement between a retracted upright position within the frame, and a generally horizontal service position extending outwardly from the frame, said tray having two side edges, an upper edge, and a lower edge, said tray having a first major face and a second major face, said first face facing downwardly and said second face facing upwardly when the tray is in its service position, two aligned pivot pins on the frame spaced above the lower cross piece and defining a generally horizontal pivot axis for the tray, two linear tracks in the tray side edges and slidably engaging said pivot pins, said aligned pivot pins extending from said frame side members into said linear tracks, whereby the tray can be swung down about said pivot axis and moved into or out of said frame to a selected position of generally horizontal adjustment, a first stop means carried by said frame and engageable with said first face of the tray when the tray is in its service position, second stop means carried by said frame and engageable with said second face of the tray when the tray is in its service position, and wherein lower and upper stop means are disposed in respective verticaL planes spaced oppositely from a vertical plane extending through the aligned pivot pins, whereby the lower and upper stop means cooperate to support the tray in its service position.

2. A tray assembly according to claim 1, wherein:

said frame has a first face remote from the rear surface of a vehicle seat, and a second face in near proximity to the seat rear surface, said aligned pivot pins are located in an intermediate plane between the frame first face and the frame second face, and said first stop means is located at the frame first face and said second stop means is located at the frame second face.

3. A tray assembly according to claim 2, wherein said first stop means is disposed within the edge profile dimension of the frame.

4. A tray assembly according to claim 2, wherein the tray is entirely contained within the edge profile dimension of the frame when the tray is in its retracted position.

5. A tray assembly according to claim 1, wherein said second stop means comprise screw adjustment devices adjustable vertically to ensure that when the tray on reaching its service position comes into simultaneous engagement with the first and second stop means.

6. A tray assembly according to claim 1, and further comprising:

horizontally adjustable bumper means projecting from said lower cross piece of said frame to engage the rear surface of a vehicle seat to ensure that the frame is oriented generally vertically.

* * * * *